F. HACHMANN.
PISTON RING.
APPLICATION FILED FEB. 26, 1919.
1,342,380.
Patented June 1, 1920.
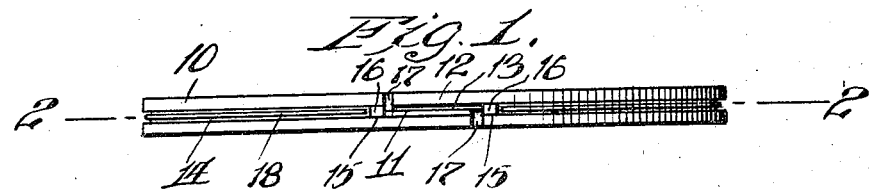
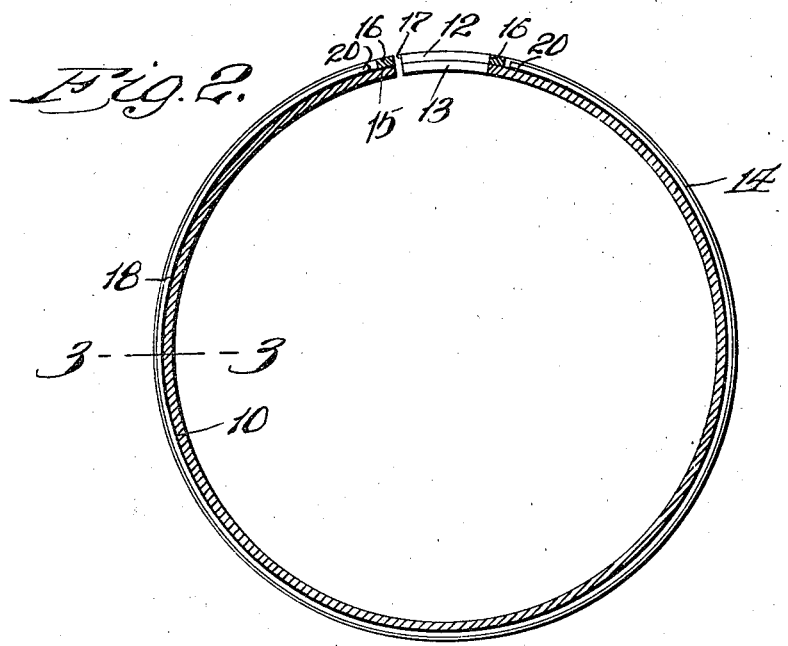
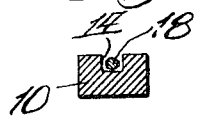
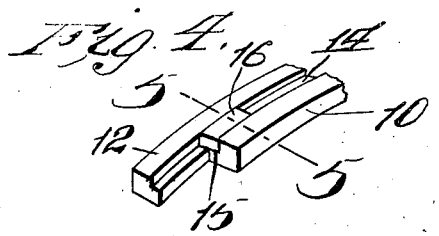
Inventor:
Frederick Hachmann,
By Edward E. Longan
atty.

UNITED STATES PATENT OFFICE.

FREDERICK HACHMANN, OF ST. LOUIS, MISSOURI, ASSIGNOR OF ONE-HALF TO HERMAN C. STIFEL, OF ST. LOUIS, MISSOURI, ONE-EIGHTH TO DAVID M. HUTCHINSON, OF FERGUSON, MISSOURI, AND ONE-SIXTEENTH TO PHILIP E. MOODY, ONE-SIXTEENTH TO CHAUNCEY R. WATSON, AND ONE-SIXTEENTH TO H. A. WRIGHT, ALL OF DETROIT, MICHIGAN.

PISTON-RING.

1,342,380.   Specification of Letters Patent.   Patented June 1, 1920.

Application filed February 26, 1919. Serial No. 279,238.

*To all whom it may concern:*

Be it known, that I, FREDERICK HACHMANN, a citizen of the United States, and resident of the city of St. Louis and State of Missouri, have invented certain new and useful Improvements in Piston-Rings, of which the following is a specification containing a full, clear, and exact description, reference being had to accompanying drawings, forming a part thereof.

My invention relates to certain new and useful improvements in "piston rings" and has for its primary object a piston ring which is provided with an oil or lubricant retaining groove and a means for forcing or pumping the oil out of said groove to the cylinder surface.

A further object is to provide a piston ring with a circumferential groove, the groove being plugged at both ends where the lap joint is located so that no oil will seep into the joint, and a loosely mounted ring located within this groove so that the ring will move upward and downward and force the accumulated oil in the groove against the cylinder wall.

A further object is to provide a piston ring with a means whereby oil may be distributed to the walls of the cylinder by means of a ring loosely mounted in a reservoir carried by the piston ring.

In the drawings:

Figure 1 is a side view of my device showing the lap, oil reservoir, plugs and pumping ring made use of.

Fig. 2 is a diametrical sectional view taken on the line 2—2 of Fig. 1.

Fig. 3 is a cross section taken on the line 3—3 of Fig. 2.

Fig. 4 is a perspective view of one end of the lap joint.

Fig. 5 is a cross section taken on the line 5—5 of Fig. 4.

Referring to the drawings, 10 indicates an ordinary piston ring which is provided with a recess 11 and a tongue 12, this recess 11 and tongue 12 forming the lap joint 13. This ring is provided with a recess 14 in which the lubricant for the cylinder walls is retained. The ends 15 of the recess 14 are closed by plugs 16 so that lubricant cannot enter the spaces 17 formed in the lap joint.

Within the recess 14, I place a ring 18. This ring is formed of spring material and the outside diameter of the ring is less than the outside diameter of the piston ring. Its inside diameter is greater than the outside diameter of the recess 14, thereby allowing diametrical play. In other words, the ring 18 may shift backward and forward in a horizontal plane, besides having a vertical movement, which will force the accumulated oil out of the recess 14, thereby furnishing additional lubrication to the cylinder walls. The ring 18 is also allowed a certain amount of rotary movement in the recess 14 by having its ends 20 spaced a short distance from the plugs 16.

The plugs 16 are pressed in the recess 14 and are preferably made of a softer material than the piston ring itself and small enough so as to leave a very small amount of the outer surface of each piston ring unlubricated, and as the piston rings are not held against rotation, it will be readily seen that the entire surface of the cylinder will be lubricated, or if the piston rings were held against rotation, the lap joints of the several rings used on the piston would be staggered or arranged so as to provide lubrication throughout the interior surface of the cylinder walls.

The object accomplished by my device is a more thorough lubrication between the cylinder walls and the piston rings, as it has been found in practice that the upper ring of a piston in an internal combustion engine receives very little lubricant, especially where the splash method of lubricating the cylinder walls is employed.

The operation of my device is as follows; the piston ring having been sprung in place and the engine started, a certain amount of lubricant is splashed up against the cylinder walls and in a short time the recess cut in the piston ring will become filled with this lubricant. The upward and downward movement of the piston will cause the ring 18 to move up and down within this recess. In other words, the ring 18, being loosely positioned within the recess 14, its inertia will cause it to rise when the piston starts its downward stroke and drop down when the piston starts the upward stroke, thus pumping or forcing the lubricant out of the recess 14. By this means, I am enabled to lubricate the walls of an engine cylinder much more thoroughly than is possible by the splash system now commonly used in automobile motors and the like, or rather in internal combustion engines wherein the cylinder lubricant is contained within the crank case and relies on the splash caused by the connecting rod and crank shaft to carry lubricant to the cylinder walls.

Heretofore it has been almost impossible to provide lubricant for the upper piston ring and the upper portion of the cylinder for the reason that no provision was made for lubricant being carried up to that point and what little lubricant did creep above the uppermost piston ring was almost immediately burnt to a crisp by reason of it receiving the extremely high temperature in the explosion chamber. By the use of my ring, this burning of the lubricating oil is eliminated, because the recess 14 does not receive the full heat caused by the explosion and therefore the upper portion of the cylinder is thoroughly lubricated.

In the embodiment of my invention shown, the ring is provided with an overlapping joint and the ends of the recess are closed by plugs. If desired, however, the recess 14 may be so cut as to leave sufficient material in the body of the ring for closing the ends of the recess. Furthermore my invention may be applied to any construction of a split piston ring, the lap joint not being essential. It is also obvious that any cross sectional shape of the ring 18 may be employed, it being only necessary that the cross sectional area be less than the groove in which it is located and the ring loosely mounted in said groove.

Having fully described my invention, what I claim is:

1. A piston ring composed of resilient material, laps formed on the joining edges of said ring, a peripheral recess formed in the outer surface of said ring, plugs for closing said peripheral recess at their entrance to the laps, a second ring formed of spring material seated in said recess wholly within the periphery of the piston ring, the ends of said ring being spaced a short distance away from the plugs, said second mentioned ring being vertically movable and adapted to force lubricant out of the recess by the reciprocating movement of the piston rings, said plugs also acting as means for limiting the rotation of the second mentioned ring.

2. A split piston ring having a groove cut in its outer surface, said groove being of less circumference than the outside circumference of the piston ring thereby leaving both ends adjacent the split formed in the piston ring closed, and a ring adapted to be sprung into said recess, said ring being of smaller diameter than the outside surface of the piston ring and of larger diameter than the inside surface of the groove, so that the ring may move longitudinally and vertically in said recess without coming in contact with the cylinder wall.

In testimony whereof I have signed my name to this specification, in presence of two subscribing witnesses.

FREDERICK HACHMANN.

Witnesses:
O. L. THOMPSON, Jr.,
EDNA L. BARKER.